United States Patent [19]

Bucy, Jr. et al.

[11] 4,265,595

[45] May 5, 1981

[54] TURBOMACHINERY BLADE RETAINING ASSEMBLY

[75] Inventors: Raymond W. Bucy, Jr., Terrace Park; Vicente C. Gallardo, Jr., Hamilton; Ronald C. Hollett; Eric A. Young, both of Cincinnati, all of Ohio

[73] Assignee: General Electric Company, Cincinnati, Ohio

[21] Appl. No.: 474

[22] Filed: Jan. 2, 1979

[51] Int. Cl.³ .............................................. F01D 5/32
[52] U.S. Cl. .................................. 416/220 R; 416/221
[58] Field of Search ..................... 416/220, 221, 220 R

[56] References Cited

U.S. PATENT DOCUMENTS

| 2,935,296 | 5/1960 | Hockert et al. | 416/220 |
| 3,039,740 | 6/1962 | Hockert | 416/221 |
| 3,341,174 | 9/1967 | Manning | 416/220 |
| 3,572,970 | 3/1971 | Smuland | 416/221 |
| 3,653,781 | 4/1972 | Cooper | 416/221 |

FOREIGN PATENT DOCUMENTS

| 2345605 | 10/1977 | France | 416/220 R |
| 1491480 | 11/1977 | United Kingdom | 416/221 |

*Primary Examiner*—Everette A. Powell, Jr.
*Attorney, Agent, or Firm*—Derek P. Lawrence

[57] ABSTRACT

An improved turbomachinery blade retaining assembly for locking the dovetail of a radially extending blade and a spring spacer means into a dovetail slot on a rotor includes axial retention means disposed within radially extending aligned slots within the rotor blade dovetail, the spring spacer means and the dovetail slot. Radial retention means disposed between the radial interior of the blade dovetail and the dovetail slot extend through one or more slots within the axial retention means to retain the axial retention means in place within the aligned radially extending notches.

10 Claims, 7 Drawing Figures

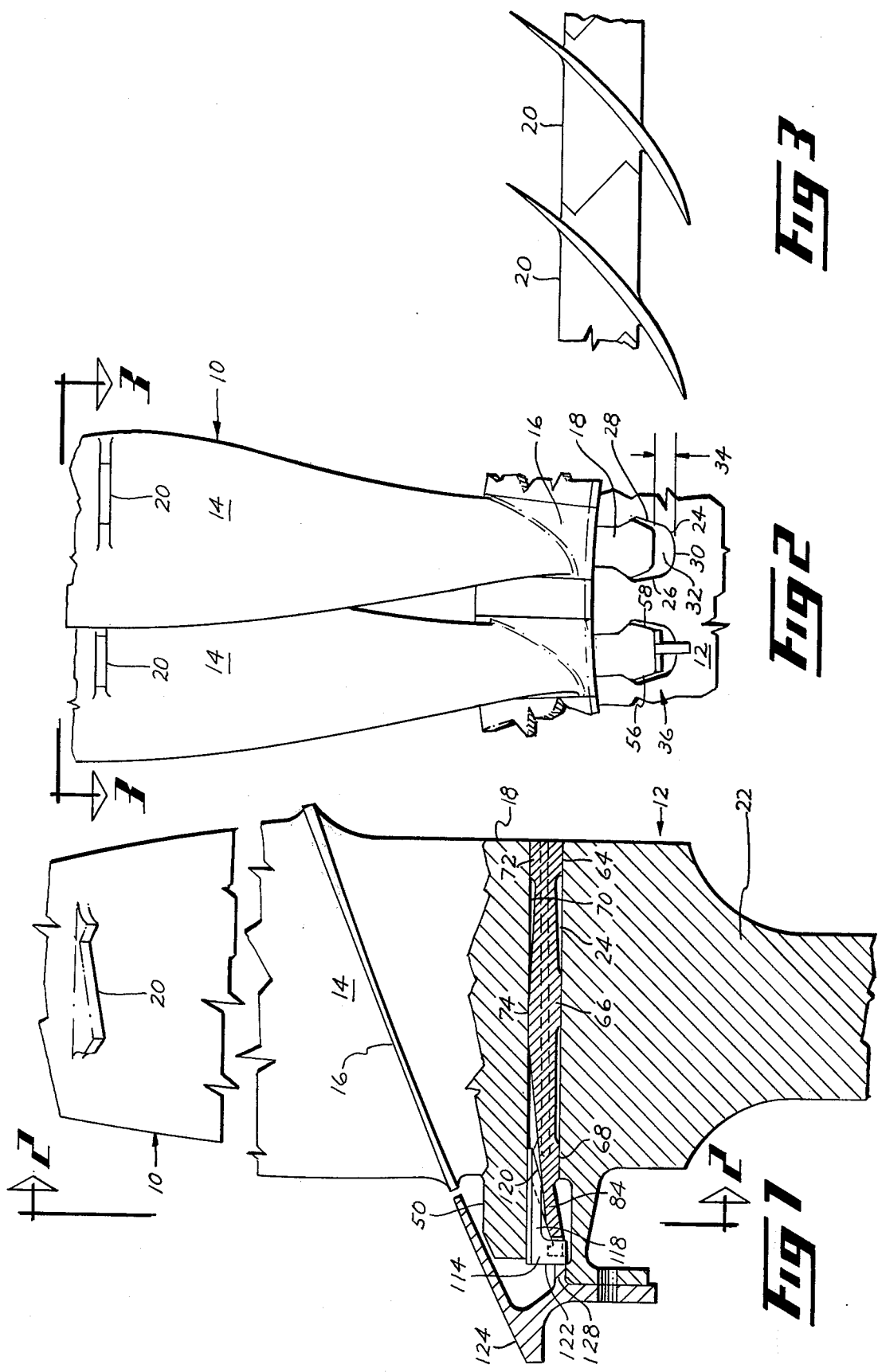

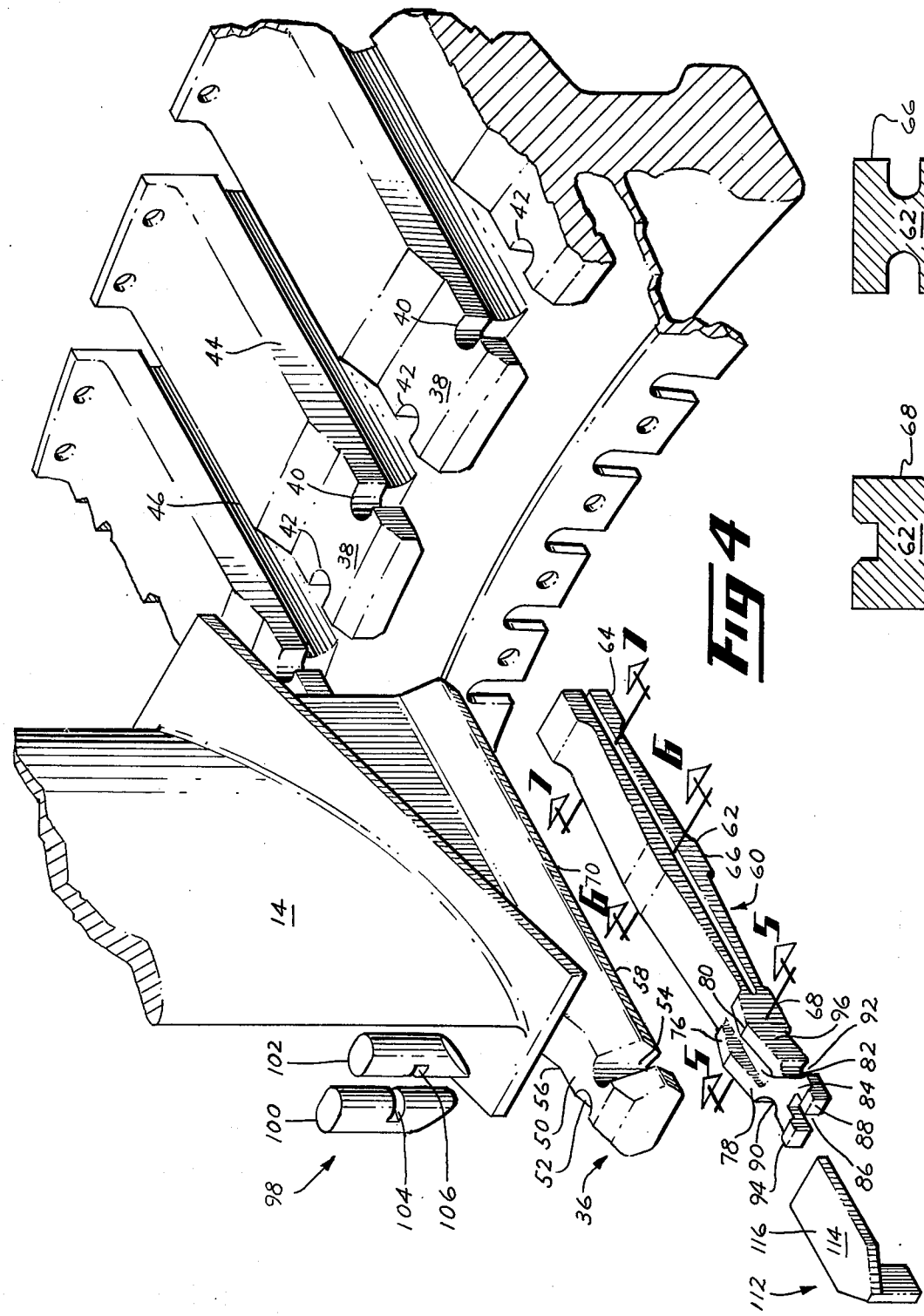

TURBOMACHINERY BLADE RETAINING ASSEMBLY

BACKGROUND OF THE INVENTION

1. Field of the Invention

This invention relates generally to turbomachinery and, more particularly, to an improved assembly for retaining blades in a turbomachinery rotor.

2. Description of the Prior Art

In the manufacture of bladed turbomachinery rotors, effective retention of the aerodynamic blades on a rotor disk has been a continually recurring problem. The most common method currently being used to secure the blades to their supporting rotor disk is that of employing blade dovetail tangs which are disposed within individual axial dovetail slots around the periphery of the rotor disk. This method has proven to be very effective for the purpose of withstanding the radial loads of the centrifugal force of the rotor. However, since there are also considerable axial forces on the blades, particularly with respect to blade tip rubs, foreign object impacts and secondary impacts resulting from foreign object damage, it is also necessary to provide for positive axial blade retention in both axial directions.

Many different and varied devices and mechanisms have been utilized in the past to axially retain the rotor blade dovetails within the dovetail slots. While many of these prior art devices and mechanisms are relatively effective, they are usually complex in nature and expensive to produce. They also add unnecessary weight to the rotor which tends to decrease overall operating efficiency.

When the rotor blades are large, as for example in the case of a high bypass fan for a gas turbine engine, interlocking blade shrouds are commonly employed to prevent excessive blade deflection and to dampen vibration. To facilitate the removal and/or replacement of an individual shrouded blade from a fully assembled rotor it is common to radially oversize the dovetail slot so that a blade may be moved radially inwardly a sufficient distance in order to clear the adjacent blade shrouds. When such radially oversized dovetail slots are utilized it is necessary to hold each blade radially tight against its individual dovetail slot since experience has shown that even a relatively small amount of tangential freedom of the blade tang within its dovetail slot permits relative motion during periods of windmilling. Such relative motion may cause excessive wear of the dovetail slot protective coating which in turn may permit increased galling wear of the dovetail slot as well as the mating blade shroud faces, thereby resulting in increased maintenance expenses and reduced disk life. While some prior art blade retainers have been successful in preventing such relative motion, they are also usually expensive to produce and add unnecessary weight to the rotor.

SUMMARY OF THE INVENTION

It is, therefore, an object of the present invention to provide a blade retaining assembly having improved axial retention capability.

It is another object of the present invention to provide such a blade retaining assembly which minimizes relative motion between the blade dovetails and the rotor disk dovetail slot.

It is a further object of the present invention to provide such a blade retaining assembly which is relatively simple, light in weight and easy to assemble.

Briefly stated, these objects as well as additional objects and advantages which will become apparent from the following specification and the appended drawings and claims are accomplished by the present invention which, in one form, provides an improved blade retaining assembly for locking a dovetail of a generally radially extending blade into a dovetail slot on a turbomachinery rotor. The retaining assembly comprises first and second notches extending generally radially along first and second lateral sides of the blade dovetail and third and fourth notches extending generally radially along corresponding first and second dovetail slot side walls, the first notch being axially aligned with the third notch and the second notch being axially aligned with the fourth notch when the blade dovetail is received within the dovetail slot. An axial retention means including one or more notches extending therethrough is disposed within the aligned notches for axially retaining the blade dovetail in place within the dovetail slot. Spring spacer means including appropriately aligned radially extending notches is interposed between the radial interior of the blade dovetail and the dovetail slot and is also held axially in place by the axial retention means. A radial retention means disposed between the radial interior of the blade dovetail and the dovetail slot extends through the one or more axial retention means slots for radially retaining the axial retention means in place within the aligned notches.

BRIEF DESCRIPTION OF THE DRAWINGS

FIG. 1 is a cross-sectional view of a blade and rotor combination to which the present invention has been applied.

FIG. 2 is an axial view thereof taken along line 2—2 of FIG. 1 and including two blades installed in the rotor, (one of the blades being shown) without the present invention for the purpose of clarity.

FIG. 3 is a view along line 3—3 of FIG. 2 disclosing the integral shroud structure of the blades.

FIG. 4 is an exploded perspective view of FIG. 1.

FIG. 5 is a cross-sectional view of the spacer portion of FIG. 4 taken along the line 5—5.

FIG. 6 is a cross-sectional view of the spacer portion of FIG. 4 taken along the line 6—6.

FIG. 7 is a cross-sectional view of the spacer portion of FIG. 4 taken along the line 7—7.

DESCRIPTION OF THE PREFERRED EMBODIMENT

Referring to the drawings wherein like numerals correspond to like elements throughout, attention is first directed to FIG. 1 wherein a radially extending turbomachinery rotor blade shown generally as 10 is depicted in combination with a rotor or rotor disk shown generally as 12. The blade 10, which in this particular embodiment comprises a fan blade on a turbofan gas turbine engine, has a relatively large radial dimension and includes an airfoil 14, a platform 16 and a radially inwardly extending dovetail 18. A midspan shroud 20 extends circumferentially on either side of the blade 10 and cooperates with similar shrouds on adjacent blades to restrict relative motion in order to provide stability and to limit deflections of the blade 10. The rotor disk 12 comprises a load carrying portion 22 which is mechanically connected to a shaft (not shown)

which in turn is drivingly connected to a turbine (not shown). The turbine extracts energy from a high energy fluid flow in a conventional manner to turn the shaft, thereby rotating the rotor disk 12.

Referring now to FIGS. 1 and 2, the rotor disk 12 is depicted as including a plurality of dovetail slots 24 (one of which is shown in FIG. 2 for purposes of clarity, without the retaining assembly of the present invention) extending generally axially across its periphery. Each slot 24 is generally U-shaped in cross section with side walls 26 and 28 forming the legs of the "U" and a contoured bottom wall 30 forming the base of the "U". Within each slot 24 is disposed a blade dovetail 18, the radial depth of each slot 24 being such that with the blade dovetail 18 in place there exists a defined space 32 having a predetermined radial height 34.

The space 32 serves the function of permitting the individual rotor blades 10 to be moved radially inwardly with respect to the rotor disk 12 prior to axial removal from the slot 24 in order to disengage the midspan shrouds 20 from contact with one another. As will be seen in FIGS. 2 and 3, in order to withdraw a rotor blade 10 from its slot 24 it is first necessary to remove the midspan shroud 20 from its interlocking relationship with the adjacent midspan shrouds.

Rotor disks of the variety described above generally rotate at extremely high velocities. As a result, in the absence of effective means for axially maintaining the blade positions certain conditions, such as the reaction of the airfoils to foreign object impingement, blade tip rubs, blade vibration or reactions to air movement would tend to drive the blade dovetails 18 axially out of the dovetail slots 24. If such were to occur during operation, extensive damage could be inflicted upon the associated engine and its surroundings. It is, therefore, necessary to provide a blade retaining assembly for maintaining the blades 10 in a fixed axial position within the rotor disk 12. Furthermore, in order to minimize wear and extend component life, the blades 10 must also be so fixed within the disk slots 24 so that relative motion between the dovetail tangs 18 and the slots 24 is effectively precluded. The present invention accomplishes this by providing an improved blade retaining assembly (shown generally in FIGS. 2 and 4 as 36) which effectively maintains a blade dovetail 18 within its respective dovetail slot 24 in a positive, tight-fitting and selectively releasable manner.

For ease in explanation, the following description pertains to the retention of only a single rotor blade 10 within a single dovetail slot 24. It should be understood, however, that the present invention applies in the same manner to a plurality of blades.

Referring now to FIGS. 1 and 4, there is depicted the improved blade retaining assembly 36 of the present invention. The rotor disk 12 includes a plurality of axial projections 38 which extend axially forward from the disk posts. Each disk post projection 38 includes a pair of generally axially aligned semi-circularly shaped notches 40 and 42 extending generally radially along lateral side walls 44 and 46, respectively. Although in this embodiment, notches 40 and 42 (and various other notches hereinafter to be described) are described as being generally semi-circular in shape, this should not in any way be considered as limiting since these notches could be of any other shape suitable for the performance of their respective functions as hereinafter described.

As is best seen in FIGS. 1, 2 and 4, a portion of the blade dovetail 18 (shown as 50) extends axially forward of the dovetail slot 24 to an axial position substantially the same as that of the disk post projections 38. The forward blade dovetail portion 50 includes a pair of generally axially aligned semi-circularly shaped notches 52 and 54 extending generally radially along lateral blade dovetail sides 56 and 58, respectively. The blade dovetail notches 52 and 54 are also respectively axially aligned with the above-described disk post projection notches 40 and 42.

A spring spacer means 60 is interposed within the space 32 between the radial interior of the blade dovetail 18 and the dovetail slot bottom wall 30 for exerting a radially outwardly directed force or preload upon the blade dovetail 18 in order to limit relative motion between the rotor blade 10 and the rotor disk 12. The spring spacer means or spring spacer 60 includes a generally axially extending elongated base member portion 62 having an axial length substantially equal to the length of the dovetail slot 24. The base member 62 has a cross-sectional shape similar to that of an "I" beam (as depicted in FIGS. 6 and 7), thereby providing for a high degree of radial strength while eliminating the excess weight which would otherwise be associated with a similarly sized solid member. Although an "I" beam cross-sectional shape is employed in this embodiment, this should not be considered as limiting the scope of the present invention since the base member 62 could have any other suitable cross-sectional shape.

The base member 62 includes three lands 64, 66 and 68 at the aft end, midlength and forward end respectively, which protrude both radially inwardly and radially outwardly therefrom. (As used herein the term "aft" refers to the right of the figures depicted in the drawings and the term "forward" refers to the left of the figures depicted in the drawings). The radially inwardly facing surface of each of the lands 64, 66 and 68 is contoured to engage the contoured disk slot bottom wall 30 (shown generally in FIGS. 5 and 6). The radially outwardly facing surface of lands 64 and 66 are generally flat (as depicted in FIGS. 1, 4 and 6) to engage the flat radially inwardly facing surface 70 of the blade dovetail 18 at locations 72 and 74, respectively. The radial height of lands 64 and 66 is slightly less than the radial height 34 of space 32 to allow for assembly of the spring spacer 60 under the blade dovetail 18. The radially outwardly facing surface of the forward land 68 is comprised of two sloping surfaces 76 and 78 which meet at the axial midpoint of the forward land 68 to form an apex 80. For reasons which will hereinafter become apparent, the radial height of the forward land 68 (as shown in FIGS. 5 and 6) at the apex 80 is slightly less than the radial height of lands 64 and 66.

A generally rectangularly shaped slot or notch 82 extends axially along a portion of the two sloping surfaces 76 and 78 and the apex 80 in the vicinity of the lateral midpoint thereof. The purpose of the notch 82 will hereinafter become apparent.

The spring spacer 60 further includes a forward portion 84 which extends generally axially forward and slopes slightly radially inwardly from the base member 62 to a point slightly aft of the forward end of the forward blade dovetail portion 50. The forward spring spacer portion 84 is generally a continuation of sloping surface 78 and includes a generally rectangularly shaped notch 86 which extends generally radially along its forward axial end 88 in the vicinity of its lateral midpoint. The purpose of the notch 86 will hereinafter become apparent.

The forward spring spacer portion 84 also includes a pair of generally axially aligned semi-circularly shaped notches 90 and 92 extending generally radially along lateral sides 94 and 96 respectively. The forward spring spacer portion notches 90 and 92 are also respectively axially and radially aligned with the above-described blade dovetail notches 52 and 54.

An axial retention means shown generally as 98 is comprised of a pair of generally cylindrical pins 100 and 102. Pin 100 is disposed within aligned notches 40, 52 and 90 and pin 102 is disposed within aligned notches 42, 54 and 92, both pins acting to axially retain the blade dovetail 18 and the spring spacer 60 in place within the dovetail slot 24, thereby axially locking the rotor blade 10 within the rotor disk 12. The pins 100 and 102 may include a threaded opening (not shown) on the radially outwardly facing surface to facilitate their removal by means of a threaded tool (not shown) which may be inserted therein.

The pins 100 and 102 each include a generally rectangularly shaped notch 104 and 106, respectively, extending generally axially therethrough. Again, although in this embodiment notches 104 and 106 (as well as other notches hereinbefore described) are described as being generally rectangularly shaped, this should not be considered as limiting since these notches could be of any suitable shape. The pins 100 and 102 are oriented within their respective aligned notches so that the pin notches 104 and 106 face each other as shown in FIG. 4.

A radial retention means (shown generally as 112), comprised of an axially oriented wedge shaped member 114, is disposed between the radial interior of the forward blade dovetail portion 50 and the radial exterior of the forward spring spacer portion 84 and extends axially through the pin notches 104 and 106 for radially retaining the pins 100 and 102 in place within their respective aligned notches. The wedge shaped member 114 has a generally flat radially outwardly facing surface 116 which engages the flat radially inwardly facing blade dovetail surface 70. The inner radial surface of the wedge shaped member 114 also includes an axially oriented generally radially extending rail 118 (best seen in FIG. 1) which is disposed within the axially oriented spring spacer base member notch 82 for lateral retention and alignment purposes. In addition, the sloped radially inward surface 120 of the wedge shaped member 114 acts against the apex 80 to push the wedge shaped member 114 radially outwardly against the blade dovetail 18 thereby completing the blade radial preload.

The axially forward end 122 of the wedge 114 extends radially inwardly and is disposed within the forward axial spring spacer notch 86 for lateral retention and alignment of the wedge shaped member 114. Structural means 124 which in this embodiment is comprised of a fan spinner including an annular supporting flange 128, abuts against the axially forward wedge end 122 in order to axially retain the wedge shaped member 114 in place.

Assembly of the above-described blade retainer is accomplished by first inserting a rotor blade dovetail 18 and then a spring spacer 60 into a rotor disk dovetail slot 24 so that notches 40, 52 and 90 are axially aligned and notches 42, 54 and 92 are axially aligned. Next, the two cylindrical pins 100 and 102 are inserted into their respective aligned notches so that the pin notches 104 and 106 face each other. Next, the wedge shaped member 114 is inserted into the space between the forward dovetail tang portion 50 and the forward spring spacer portion 84 so that it spans the pin notches 104 and 106 and pushes radially outwardly on the blade dovetail 18. The same procedure is followed for the adjacent blades 10, the midspan shrouds of which are appropriately interlocked as hereinbefore described. When all of the blades 10 and retainer assemblies 36 are properly installed within the dovetail slots 24, the fan spinner 124 is positioned such that the fan spinner flange 128 abuts each axially forward wedge end 122 and is bolted in place. Removal of all or any one of the blades 10 is accomplished by reversing the above-described procedure.

From the foregoing it can be seen that the present invention provides a blade retaining assembly which is relatively simple, light in weight and easy to assemble but which provides improved axial as well as radial blade retention. It will be recognized by one skilled in the art that changes may be made to the above-described invention without departing from the broad inventive concepts thereof. It is to be understood, therefore, that this invention is not limited to the particular embodiment as above disclosed, but it is intended to cover all modifications which are within the scope and spirit of the invention as set forth in the appended claims.

What is claimed is:

1. An improved blade retaining assembly for locking a generally radially extending blade in a turbomachinery rotor, the blade having a dovetail at its radially inward end and the rotor having a dovetail slot extending generally axially across its periphery from one side of the rotor to the other, the blade dovetail being received within the dovetail slot including:
   a first notch extending generally radially along a first lateral side of the blade dovetail;
   a second notch extending generally radially along the other lateral side of the blade dovetail;
   a third notch extending generally radially along a first dovetail slot side wall corresponding to the first blade dovetail lateral side, said third notch being axially aligned with said first notch;
   a fourth notch extending generally radially along the other dovetail slot side wall, said fourth notch being axially aligned with said second notch;
   axial retention means disposed within the aligned notches for axially retaining the blade dovetail in place within the dovetail slot wherein the improvement comprises:
   spring spacer means interposed between the radial interior of the blade dovetail and the dovetail slot for exerting a radially outwardly directed force upon the blade dovetail;
   a fifth notch extending radially along a first lateral side of the spring spacer means, said fifth notch being axially and radially aligned with said first notch;
   a sixth notch extending radially along the other lateral side of the spring spacer means, said sixth notch being axially and radially aligned with said second notch; and
   wherein said axial retention means is disposed within the fifth and sixth notches for retaining the spring spacer means in place within the dovetail slot.

2. The improved blade retaining assembly as recited in claim 1 and further including:

one or more notches extending generally axially through the axial retention means; and radial retention means disposed between the radial interior of the blade dovetail and the dovetail slot and extending through said one or more axial retention means notches for radially retaining the axial retention means in place within the aligned notches.

3. The improved blade retaining assembly as recited in claim 1 wherein the spring spacer means comprises a generally axially extending member having radially inwardly and radially outwardly protruding lands therefrom, said radially inwardly protruding lands generally conforming to the contour of the dovetail slot.

4. The improved blade retaining assembly as recited in claim 2 wherein the spring spacer means includes a seventh notch extending radially along the forward axial end thereof; and the radial retention means includes a generally radially exending rail on a radial side thereof, said rail being disposed within said seventh notch.

5. The improved blade retainer assembly as recited in claim 2 wherein the spring spacer means includes an eighth notch extending axially along a portion of a radial side thereof; and the radial retention means includes a generally axially extending rail portion on a radial side thereof, said rail portion being disposed within said eighth notch.

6. The improved blade retaining assembly as recited in claim 1 wherein:

the first, second, third and fourth notches are generally semi-circularly shaped; and the axial retention means is comprised of a pair of generally cylindrical pins, each pin including a notch extending generally axially therethrough for receiving radial retention means.

7. The improved blade retaining assembly as recited in claim 6 and further including means for orienting the pins so that the pin notches face each other for receiving opposite sides of an axially oriented radial retention member.

8. The improved blade retaining assembly as recited in claim 2 and further including structural means attached to the rotor for axially retaining the radial retention means in place.

9. The improved blade retaining assembly as recited in claim 8 wherein:

the blade is a fan blade; and the structural means is a fan spinner flange.

10. An improved blade retaining assembly for locking a generally radially extending blade in a turbomachinery rotor, the blade having a dovetail at its radially inward end and the rotor having a dovetail slot extending generally axially across its periphery from one side of the rotor to the other, the blade dovetail being received within the dovetail slot including:

a first generally semi-circularly shaped notch extending generally radially along a first lateral side of the blade dovetail;

a second generally semi-circularly shaped notch extending generally radially along the other lateral side of the blade dovetail;

a third generally semi-circularly shaped notch extending generally radially along a first dovetail slot side wall corresponding to the first blade dovetail lateral side, said third notch being axially aligned with said first notch;

a fourth generally semi-circularly shaped notch extending generally radially along the other dovetail slot side wall, said fourth notch being axially aligned with said second notch;

wherein the improvement comprises:

spring spacer means interposed between the radial interior of the blade dovetail and the dovetail slot for exerting a radially outwardly directed force upon the blade dovetail, said spring spacer means including:

a fifth generally semi-circularly shaped notch extending generally radially along a first lateral side thereof, said fifth notch being axially and radially aligned with said first notch; and a sixth generally semi-circularly shaped notch extending generally radially along the other lateral side thereof, said sixth notch being axially and radially aligned with said second notch;

a pair of generally cylindrical pins a first of said pins being disposed within the first, third, and fifth aligned notches and the other pin being disposed within the second, fourth and sixth aligned notches, said pins each including a notch extending generally axially therethrough, said pins being oriented so that said pin notches face each other; and radial retention means disposed between the radial interior of the blade dovetail and the spring spacer means and extending through said pin notches for axially retaining the pins in place within their respective aligned notches.

* * * * *